(12) United States Patent
Chang

(10) Patent No.: US 10,904,458 B2
(45) Date of Patent: Jan. 26, 2021

(54) ERROR CORRECTION UNIT FOR TIME SLICE IMAGE

(71) Applicant: 3DIGIVIEW ASIA CO., LTD., Goyang-si (KR)

(72) Inventor: Christopher Chinho Chang, Pleasanton, CA (US)

( * ) Notice: Subject to any disclaimer, the term of this patent is extended or adjusted under 35 U.S.C. 154(b) by 0 days.

(21) Appl. No.: 15/757,334

(22) PCT Filed: Sep. 5, 2016

(86) PCT No.: PCT/KR2016/009903
§ 371 (c)(1),
(2) Date: Mar. 2, 2018

(87) PCT Pub. No.: WO2017/039416
PCT Pub. Date: Mar. 9, 2017

(65) Prior Publication Data
US 2018/0241950 A1 Aug. 23, 2018

(30) Foreign Application Priority Data

Sep. 3, 2015 (KR) .................. 10-2015-0125094

(51) Int. Cl.
*H04N 5/262* (2006.01)
*G06T 7/80* (2017.01)
(Continued)

(52) U.S. Cl.
CPC ............. *H04N 5/2627* (2013.01); *G06T 7/80* (2017.01); *H04N 5/23229* (2013.01);
(Continued)

(58) Field of Classification Search
CPC .. H04N 5/2627; H04N 5/23229; H04N 5/262; H04N 13/20; H04N 9/07;
(Continued)

(56) References Cited

U.S. PATENT DOCUMENTS 5,699,444 A 12/1997 Palm
6,327,381 B1 12/2001 Rogina et al.
(Continued)

FOREIGN PATENT DOCUMENTS

JP 2004-266511 A 9/2004
KR 10-0987775 B1 10/2010
(Continued)

OTHER PUBLICATIONS

Cho, Kyeong Seok, "A Study on Methods of Extracting Standard Dot Pattern Information and Compensating Distorted Images using Reference Dot Pattern Images," Graduate School of Hallym University, Master's Thesis, pp. 25-27, 31-49 (Dec. 2007).

*Primary Examiner* — Luong T Nguyen
(74) *Attorney, Agent, or Firm* — Loza & Loza, LLP; Thomas H. Ham

(57) ABSTRACT

The present invention relates to an error correction unit for a time slice image. The present invention comprises: a stand having a length corresponding to the height of an object and standing upright; and a plurality of marker members, installed on the stand, for indicating a plurality of reference positions for setting an offset reference value, and providing the same shape in all directions. The present invention can readily set the offset reference value through the plurality of reference positions.

8 Claims, 16 Drawing Sheets

(51) Int. Cl.
*H04N 13/243* (2018.01)
*H04N 5/232* (2006.01)
*H04N 5/247* (2006.01)
*H04N 9/07* (2006.01)
*H04N 13/20* (2018.01)

(52) U.S. Cl.
CPC ............ *H04N 5/247* (2013.01); *H04N 5/262* (2013.01); *H04N 9/07* (2013.01); *H04N 13/20* (2018.05); *H04N 13/243* (2018.05); *G06T 2207/30204* (2013.01)

(58) Field of Classification Search
CPC ........ H04N 13/243; H04N 5/247; G06T 7/80; G06T 2207/30204
See application file for complete search history.

(56) References Cited

U.S. PATENT DOCUMENTS

| | | |
|---|---|---|
| 6,793,350 B1 | 9/2004 | Raskar et al. |
| 7,113,632 B2 | 9/2006 | Lee et al. |
| 8,593,524 B2 | 11/2013 | Kleihorst |
| 8,917,317 B1 | 12/2014 | Beeler |
| 9,235,897 B2 | 1/2016 | Kakuko et al. |
| 9,270,976 B2 | 2/2016 | Houvener et al. |
| 9,497,380 B1 | 11/2016 | Jannard et al. |
| 9,532,036 B2 | 12/2016 | Kim et al. |
| 9,674,504 B1 | 6/2017 | Salvagnini et al. |
| 10,080,007 B2 | 9/2018 | Ren et al. |
| 10,277,887 B2 | 4/2019 | Aoki et al. |
| 2003/0222984 A1 | 12/2003 | Zhang |
| 2005/0172695 A1 | 8/2005 | Furze et al. |
| 2007/0016386 A1* | 1/2007 | Husted .................. G01C 17/00 702/150 |
| 2007/0165942 A1 | 7/2007 | Jin et al. |
| 2010/0020178 A1 | 1/2010 | Kleihorst |
| 2010/0150455 A1 | 6/2010 | Oyama |
| 2011/0316968 A1 | 12/2011 | Taguchi et al. |
| 2013/0039586 A1 | 2/2013 | Fuchigami |
| 2013/0135439 A1 | 5/2013 | Kakuko et al. |
| 2013/0195239 A1* | 8/2013 | O'Hare ................... G01T 7/005 378/4 |
| 2014/0015924 A1 | 1/2014 | Pryor |
| 2014/0043447 A1 | 2/2014 | Huang et al. |
| 2015/0052767 A1* | 2/2015 | Sagemueller ........ G01B 21/045 33/503 |
| 2015/0084951 A1 | 3/2015 | Boivin et al. |
| 2016/0353083 A1 | 12/2016 | Aoki et al. |
| 2017/0098305 A1 | 4/2017 | Gossow |

FOREIGN PATENT DOCUMENTS

| | | |
|---|---|---|
| KR | 10-2011-0050843 A | 5/2011 |
| KR | 10-2011-0071854 A | 6/2011 |
| KR | 10-1457888 B1 | 11/2014 |
| KR | 10-2015-0028474 A | 3/2015 |
| KR | 20150028474 * | 3/2015 |

* cited by examiner

[Fig.1]
Prior Art
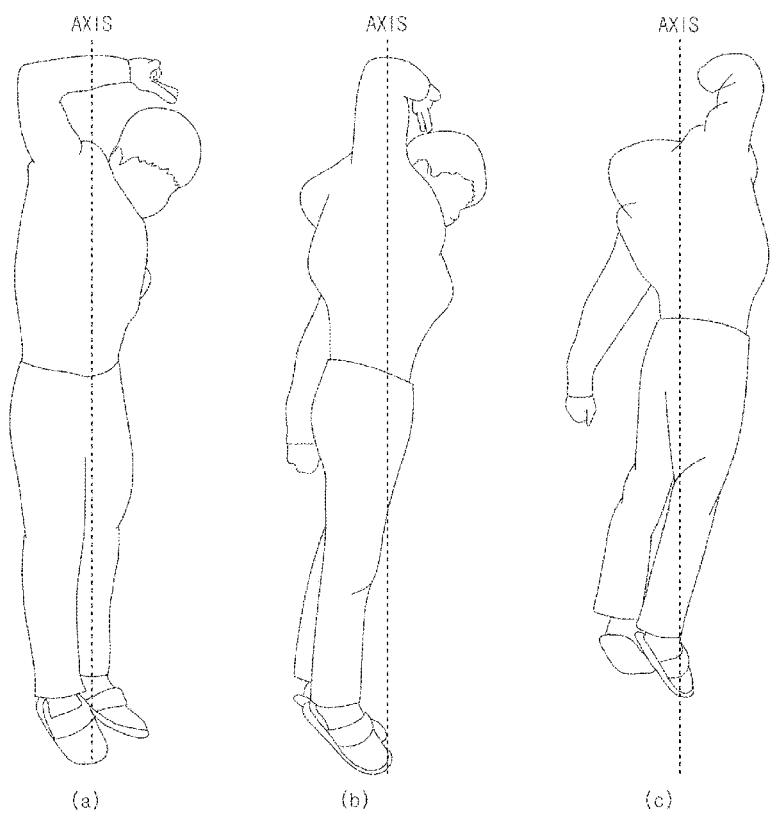
(a)　　(b)　　(c)

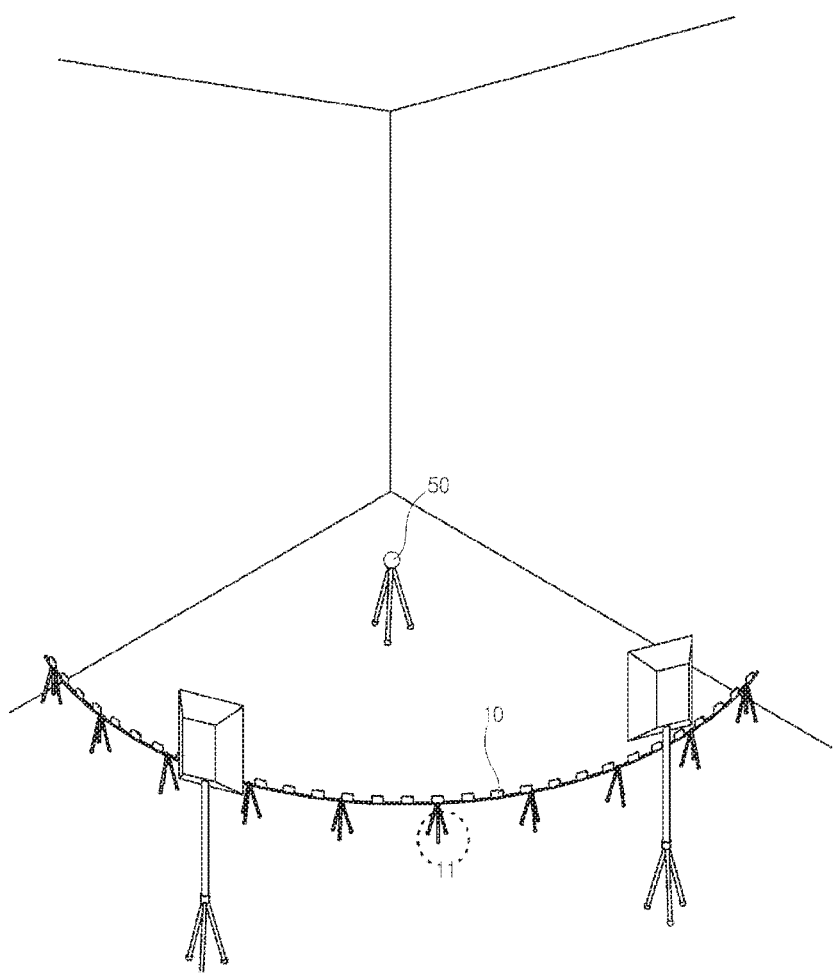
[Fig.2]
Prior Art

[Fig.3]
Prior Art
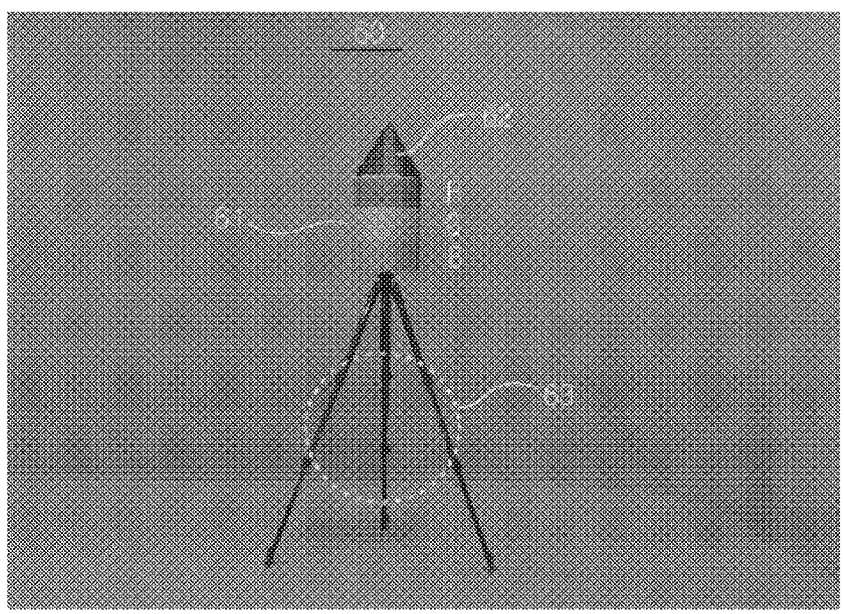

[Fig.4]
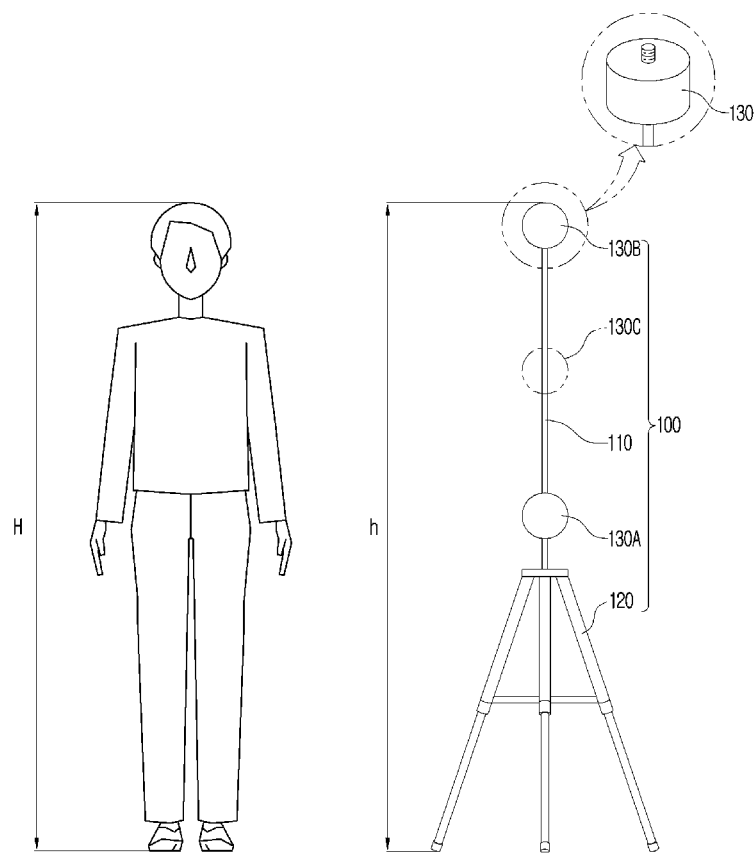

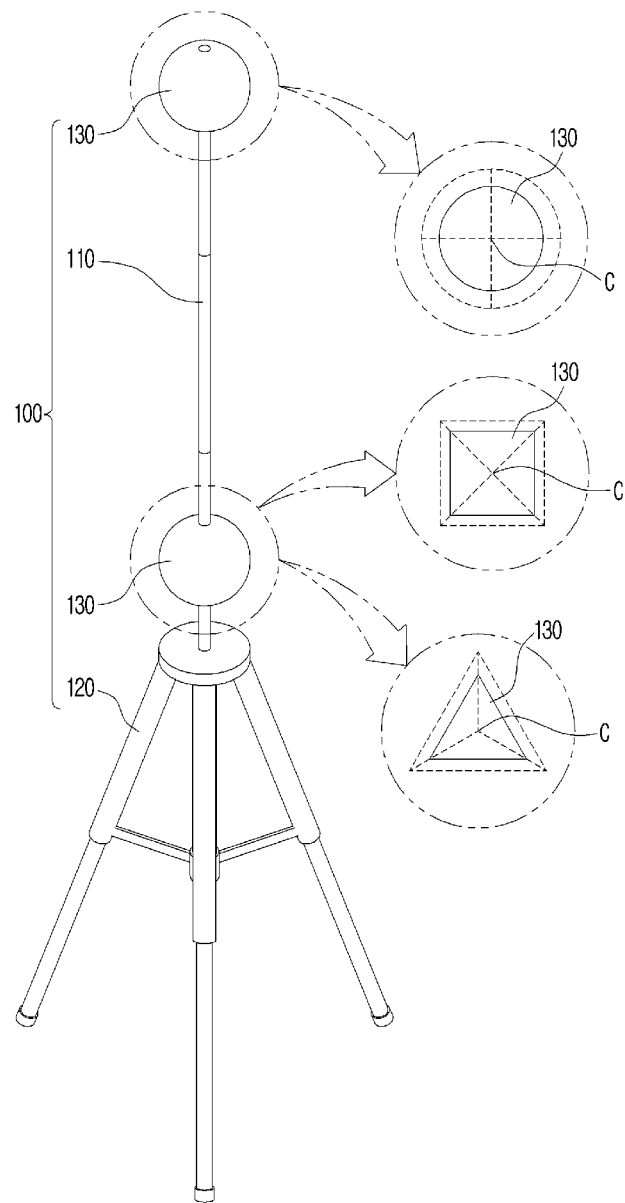
[Fig.5]

[Fig.6]
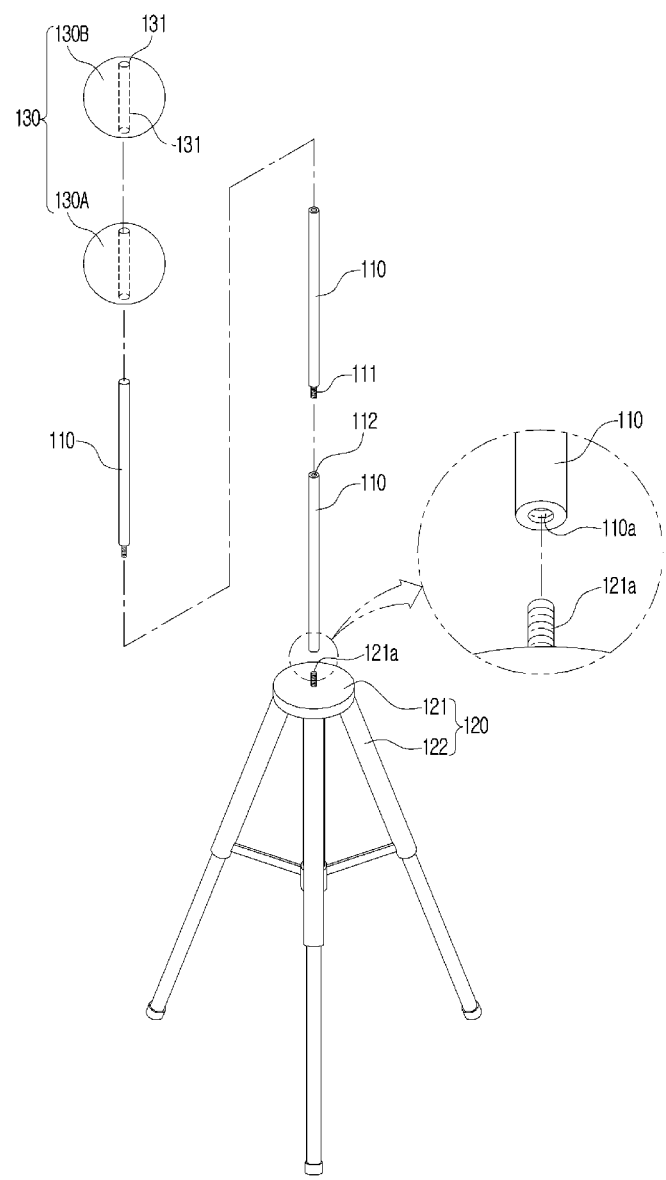

[Fig.7]
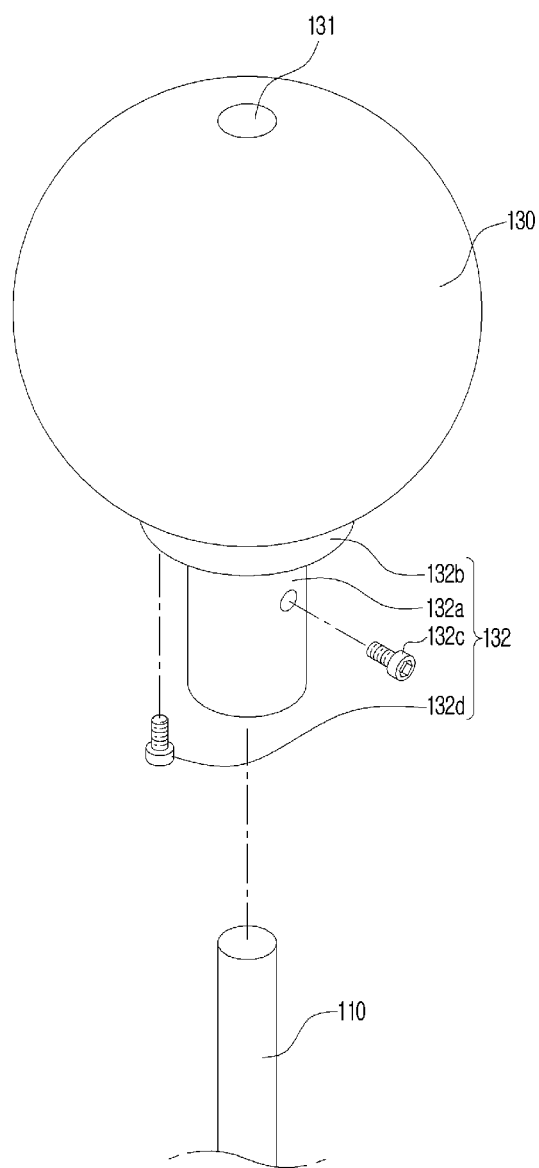

[Fig.8]
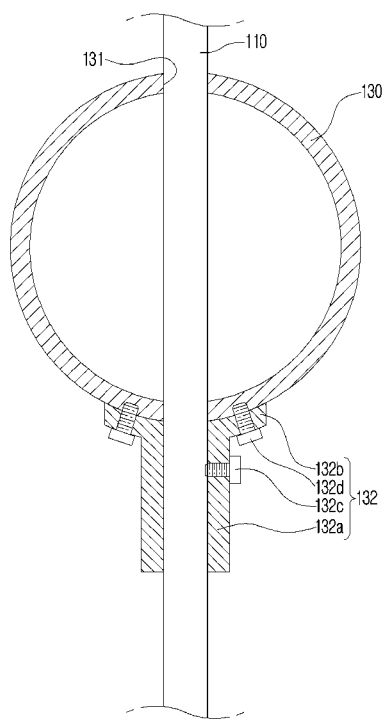

[Fig.9]
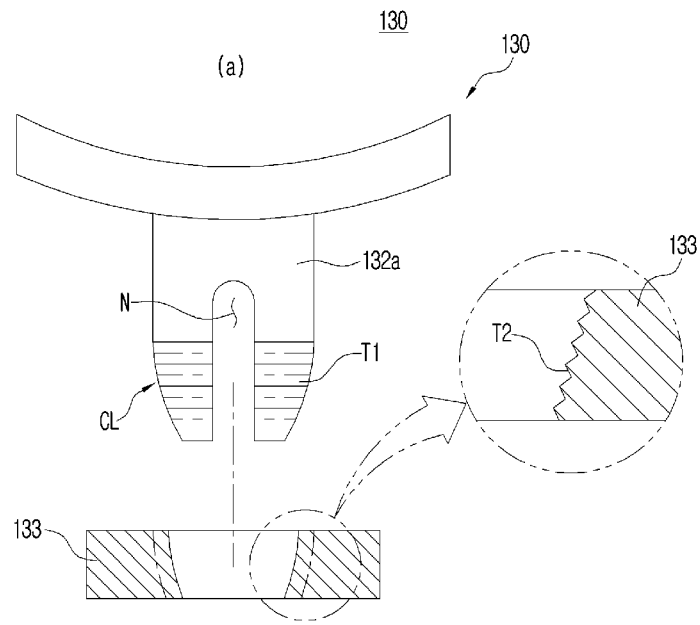
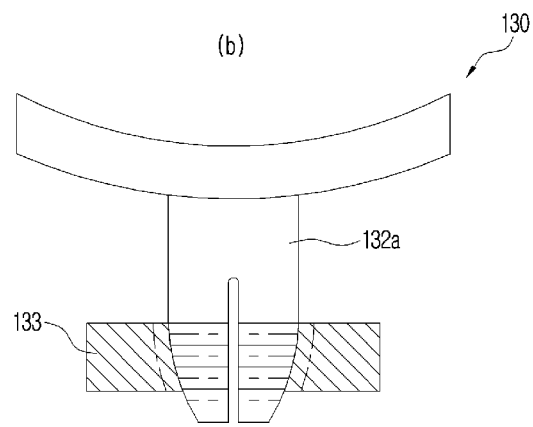

[Fig.10]
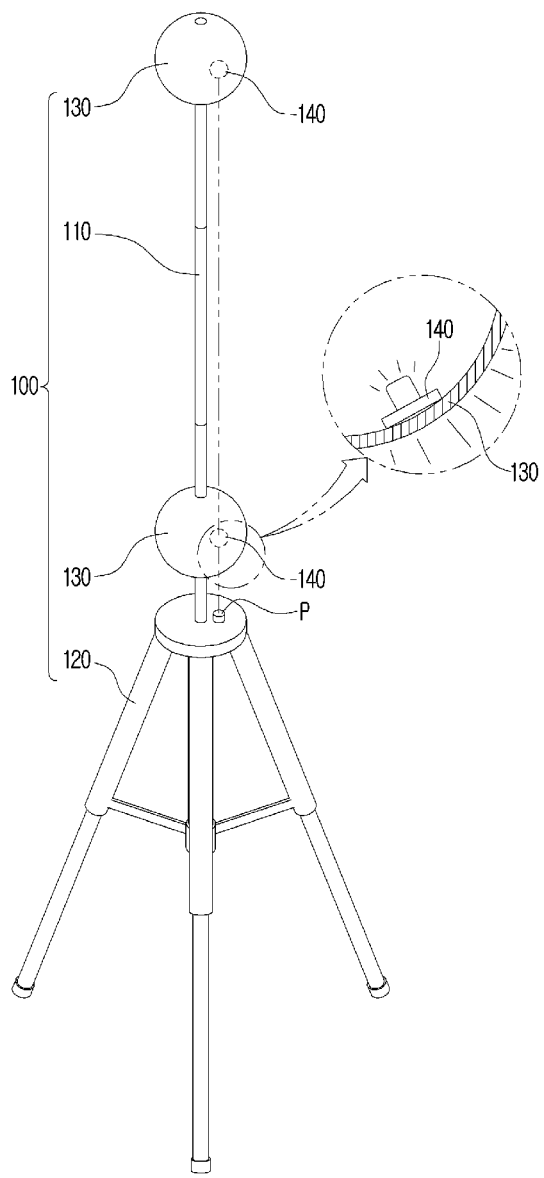

[Fig.11]
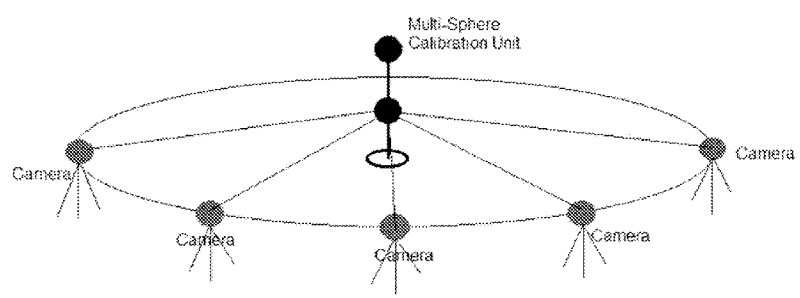
[Fig.12]
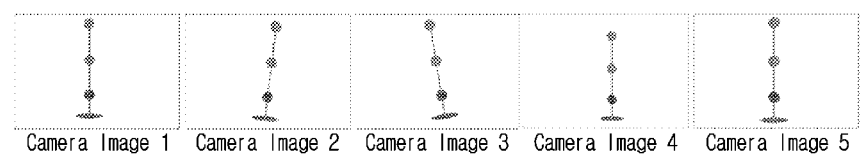

[Fig.13]
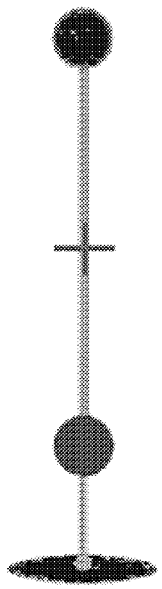
[Fig.14]
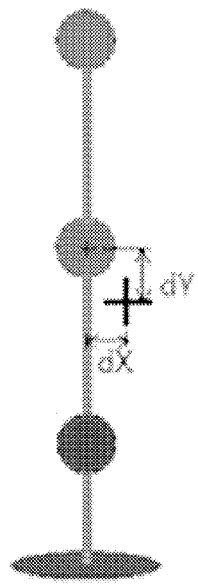

[Fig.15]
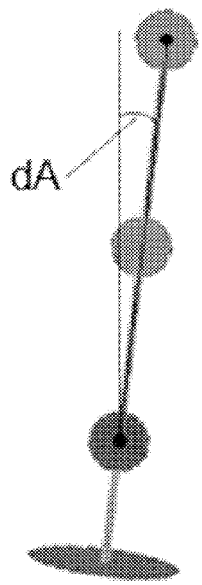
[Fig.16]
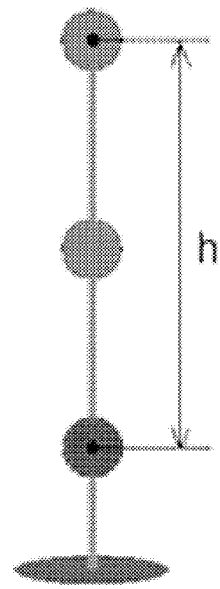

[Fig.17]
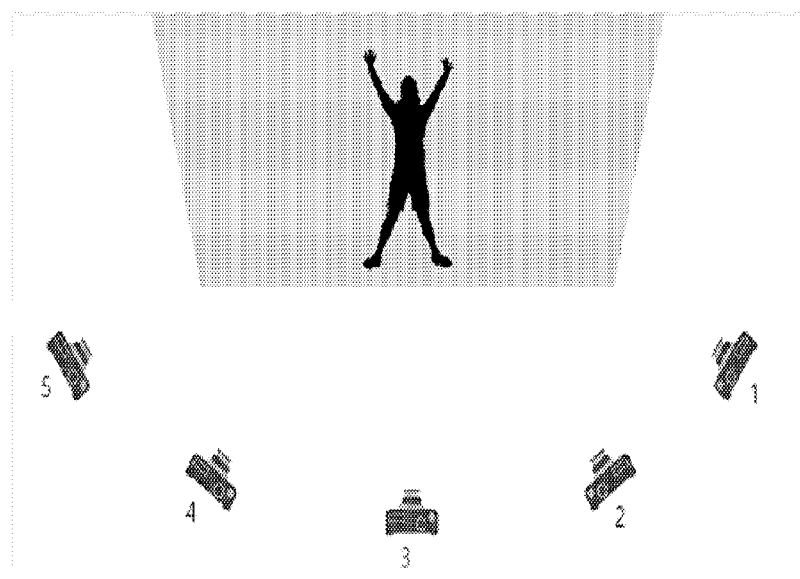
[Fig.18]
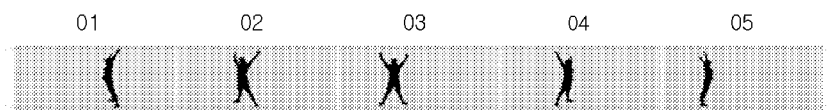

[Fig.19]
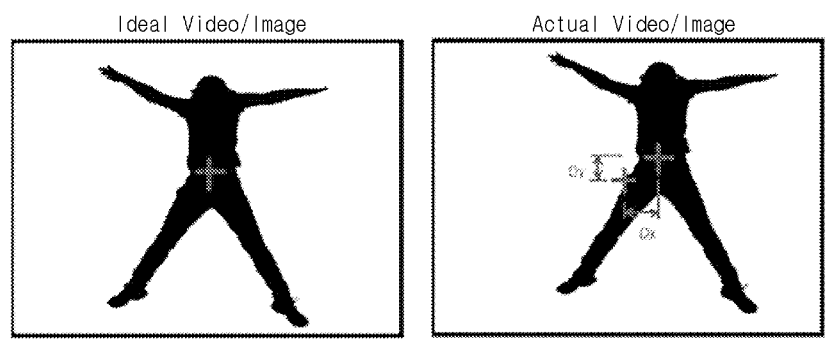
[Fig.20]
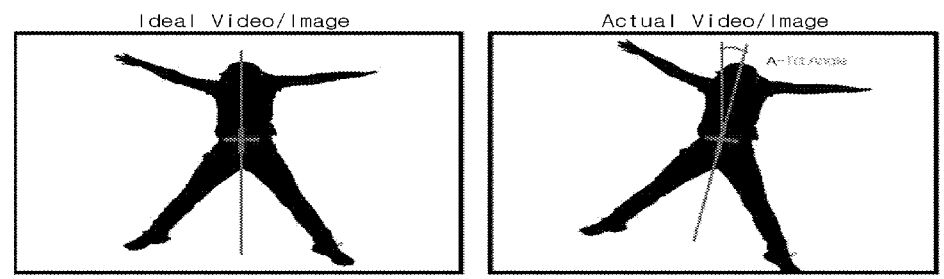

[Fig.21]
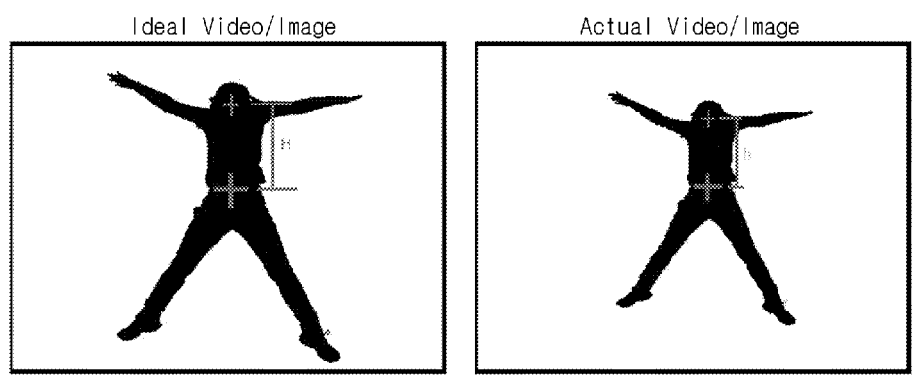

ERROR CORRECTION UNIT FOR TIME SLICE IMAGE

TECHNICAL FIELD

The present invention relates to an error correction unit for time slice images and, more particularly, to an error correction unit for time slice images, used to provide an offset reference value for correcting or calibrating an error in a time slice image.

BACKGROUND ART

In general, time slice photography is a technique of providing images of a rotating subject by simultaneously capturing images of the subject using a set of cameras surrounding the subject, in the shape of an arc or a circle, and then synthesizing the captured images to be continuously connected. Although time slice images are captured using still cameras, time slice images may be experienced in the manner of video images captured while moving around the subject, since time slice images are synthesized after being simultaneously captured from around the subject. That is, time slice photography provides 3D-like imagery.

However, in such time slice photography, due to an installation error caused by differences in height or distance among the cameras disposed surrounding a subject, different angles of inclination of the ground, or the like, as well as misfocusing, in which a focus is not set to the center of the subject, actually-captured images may not be accurate, as illustrated in FIG. 1.

To prevent such an error, the cameras first capture images of an error correction unit before actually capturing images of a subject. According to a typical error correction unit, as disclosed in Korean Patent No. 10-1457888 (ESMLab Co. Ltd.), a ball 50 is disposed on a tripod 11. The error correction unit, including the tripod 11 and the ball 50, is imaged by a plurality of cameras 10 before images of a subject are actually captured, for application of time slice photography. In addition, when images of a subject are actually captured, the ball 50 is used as an offset reference value for setting the points of view of the captured images to be the same. That is, the ball 50 substantially provides an offset reference value for correcting the points of view of images captured by the cameras 10. Thus, deviations in the points of view of the actual images of the subject, captured by the plurality of cameras 10, are corrected based on the above-described offset reference value.

However, since the error correction unit has a configuration comprised of a single ball 50, the central portion depending on the actual size or height of a subject cannot be verified. Thus, the error correction unit substantially fails to provide an offset reference value, based on which the points of view are set as the center of the subject, the images of which are actually captured. In addition, the error correction unit fails to provide an offset reference value, based on which the degrees of inclination of the images are set to be the same, since the error correction unit cannot verify the degree of inclination of the subject. Furthermore, the error correction unit cannot obtain information regarding the size or height of the subject. Thus, even in the case in which the captured images of the subject have different sizes because of different distances to the cameras 10, the error correction unit fails to provide an offset reference value, based on which the differences in the size are set to be the same. Thus, in the synthesis of the captured images, any of deviations in the viewpoint, the degree of inclination, and the size is not substantially corrected.

To overcome such problems, referring to FIG. 3, the error correction unit according to Korean Patent No. 10-1548236 (ESMLab Co. Ltd.) is provided with a cylinder 61 having a triangular pyramid 62, disposed on a tripod 63, in place of the above-stated ball 50. The surface of the cylinder 61 is taped with RGB tape, i.e. red (R) tape, green (G) tape, and blue (B) tape, and the cylinder 61 is imaged together with the triangular pyramid 62 using a plurality of cameras. The RGB tapes of the cylinder 61 are used as offset reference values for setting the colors of the cameras to be the same. Line segments connecting or inner angles of the vertices of the triangular pyramid 62 are used as offset reference values for setting the viewpoints and degrees of inclination of the cameras to be the same. That is, the cylinder 61 and the triangular pyramid 62 substantially provide offset reference values for correcting images captured by the cameras by setting the colors, viewpoints, or degrees of inclination of the images to be the same. Thus, when actual images of a subject captured by the plurality of cameras are synthesized, the deviations in the colors, the viewpoints, or the degrees of inclination are corrected, based on the above-described offset reference values.

However, this error correction unit cannot allow the center portion to be identified depending on the size or height of an actual subject, like the previously-described error correction unit. This error correction unit substantially fails to provide an offset reference value for setting the viewpoint as the center portion of the subject. In addition, information regarding the size or height of the subject cannot be obtained. Even in the case in which the subject is captured as images having different sizes due to different distances of the cameras, an offset reference value for setting the different sizes to be the same is not provided. Consequently, when the captured images are synthesized, no deviations in the viewpoint or size of the subject are substantially corrected.

DISCLOSURE

Technical Problem

Accordingly, the present invention has been made keeping in mind the above problems occurring in the prior art, and an object of the present invention is to provide an error correction unit for time slice images, the error correction unit indicating a plurality of reference positions, corresponding to the height of a subject, to be spaced apart from each other along a vertical direction, so that offset reference values are set depending on the height, degree of inclination, and/or size of the subject.

In particular, reference positions may be varied to a height corresponding to the height of a subject. Components of the error correction unit are embodied to be put together or detached from each other. In addition, reference positions can be identified using a variety of colors.

Technical Solution

In order to accomplish the above object, the present invention provides an error correction unit for providing an offset reference value for error correction of time slice images captured by cameras. The error correction unit may include: a vertically-erected stand, a length of the stand corresponding to a height of a subject, from which time slice images are captured by cameras; and marker members disposed on the stand to indicate a plurality of reference positions, based on which the offset reference value is set.

The marker members may be a plurality of marker members spaced apart from each other in a longitudinal direction of the stand, each of the marker members being configured such that the cameras surrounding the marker members capture same images from each of the marker members.

Each of the marker members may be at least one among a ball, which is imaged as a circle by the surrounding cameras, a cylinder, which is imaged as a rectangle by the surrounding cameras, and a cone, which is imaged as a triangle by the surrounding cameras.

The stand may include: a pole having a predetermined length in a vertical direction; and a base supporting a lower portion of the pole.

The pole may be comprised of a plurality of bars detachably coupled to each other, thereby defining a length thereof in a vertical direction.

The base may be a tripod, with the pole being vertically coupled to a top portion thereof.

The marker members may include: a first marker disposed on a lower portion or a central portion of the stand; and a second marker disposed on the stand, spaced apart from the first marker, to be aligned with the first marker in a line.

The marker members may further include a third marker disposed on the stand, spaced part from the second marker, to be aligned with the second marker.

Each of the marker members may include a ball, a cylinder, or a cone having a through-hole, allowing the stand to be fitted thereinto while extending therethrough.

The first marker member and the second marker member of the marker members may have different colors.

For example, each of the marker members may include: a spherical globe having a through-hole allowing the stand to vertically extend therethrough; and a fastener detachably disposed on the stand.

The fastener may include: a sleeve fixed to the globe, allowing the stand to be fitted thereinto; and a clamp coupling the sleeve to the stand, such that the sleeve is fixed to the stand.

For example, the clamp may include a stop bolt pressing the stand by extending through the sleeve.

Alternatively, the clamp may include: a collet integrally provided on a lower portion of the sleeve to be contracted in a radial direction of the sleeve; and an incline nut screw-connected to the collet and having an inner slope.

Each of the marker members may include a lighting module for emitting a predetermined color of light from the interior of the globe to light the globe.

Advantageous Effects

According to the present invention as described above, a plurality of marker members indicating reference positions may be disposed on a stand having a length corresponding to the height of a subject, such that marker members among the plurality of marker members are spaced apart from each other. Thus, at least two reference positions corresponding to the height of the subject, from which time slice images are supposed to be captured, can be indicated along the longitudinal direction of the stand. This consequently makes it possible to calculate offset reference values corresponding to the height and degree of inclination of the subject, based on the plurality of reference positions.

In particular, the marker members may have the shape of a cylinder, a cone, or a ball, from which as the same images are captured from around. The marker members can be imaged without distortion by any one of the cameras disposed surrounding the marker members, so that the center of the marker members can be easily determined.

In addition, the stand may include a base and a pole supported on the base. The stand corresponding to the height of a subject can be easily embodied. Furthermore, the pole is comprised of a plurality of bars detachably coupled to each other. The pole can be easily stored and transported, as well as being easily assembled to be used. Moreover, the base is embodied as a tripod having a telescopic structure. It is thereby possible to additionally adjust the height of the stand using the tripod as required and easily erect the pole in a vertical position even on a slope.

Furthermore, the plurality of marker members may include a first marker and a second marker disposed on both portions of the stand, thereby providing two reference positions, such that an offset reference value can be calculated based on the distance between the reference positions. In addition, a third marker may be added, allowing an offset reference value to be calculated based on one of the first to third markers located in the middle.

In addition, the marker members may be coupled to the pole of the stand by interference fitting, allowing the marker members to be fixed to the pole without additional components. When the marker members are moved along the longitudinal direction of the pole, the marker members can be properly fixed to the moved positions without additional operations or components. Thus, the fixed positions of the marker members can be easily varied. Furthermore, when the marker members are embodied as a foam ball, the marker members can be easily fabricated at low costs.

Furthermore, the plurality of marker members may have different colors, allowing the reference positions to be easily identified by the marker members. It is possible to provide offset reference values for color correction, based on the colors of the marker members. In particular, when the marker members are irradiated with light from lighting modules, the reference positions indicated by the marker members can be easily identified from long distances or at night. It is also possible to easily change the colors of the marker members using the lighting modules.

In addition, when the marker members are embodied as spherical globes disposed on the stand via fasteners, the brittleness of the marker members may be enhanced to improve durability. Furthermore, when each of the fasteners is comprised of a sleeve and a clamp, the sleeve may allow the globe to easily move while sliding along the longitudinal direction of the pole.

Furthermore, when the clamp is a stop bolt, the clamp may be easily embodied. Alternatively, when the clamp is comprised of a collet and an incline nut, the collet can hold the pole, in response to the incline nut being coupled thereto, thereby firmly fixing the sleeve to the pole.

DESCRIPTION OF DRAWINGS

FIG. 1 is a conceptual view illustrating typical time slice images imaged using a plurality of cameras;

FIG. 2 is a perspective view illustrating the use of an error correction unit for time slice images according to the related art;

FIG. 3 is a perspective view illustrating another error correction unit for time slice images according to the related art;

FIG. 4 is a perspective view illustrating an error correction unit for time slice images according to an embodiment of the present invention;

FIG. 5 is a perspective view illustrating a process of extracting a center of the marker members illustrated in FIG. 4;

FIG. 6 is an exploded perspective view illustrating the error correction unit illustrated in FIG. 4;

FIG. 7 is a perspective view illustrating another embodiment of the fastener illustrated in FIG. 6;

FIG. 8 is a longitudinal cross-sectional view illustrating the use of the fastener illustrated in FIG. 7;

FIG. 9 is a front view illustrating another embodiment of the clamp illustrated in FIG. 6;

FIG. 10 is a perspective view illustrating a lighting module disposed on the globe illustrated in FIG. 7;

FIG. 11 is a conceptual view illustrating imaging of the error correction unit illustrated in FIG. 4;

FIG. 12 is a conceptual view illustrating images of the error correction unit captured by the cameras illustrated in FIG. 11;

FIG. 13 is a conceptual view illustrating setting of an offset reference value of center coordinates using the error correction unit illustrated in FIG. 11;

FIG. 14 is a conceptual view illustrating another embodiment of the error correction unit illustrated in FIG. 4;

FIG. 15 is a conceptual view illustrating setting of an incline offset reference value using the error correction unit illustrated in FIG. 14;

FIG. 16 is a conceptual view illustrating setting of a height offset reference value using the error correction unit illustrated in FIG. 14;

FIG. 17 is a conceptual view illustrating imaging of a subject using the cameras illustrated in FIG. 14;

FIG. 18 is a conceptual view illustrating images captured by cameras in the application illustrated in FIG. 17;

FIG. 19 is a conceptual view illustrating a state in which the offset reference value of center coordinates illustrated in FIG. 13 is applied;

FIG. 20 is a conceptual view illustrating a state in which the incline offset reference value illustrated in FIG. 15 is applied; and FIG. 21 is a conceptual view illustrating a state in which the height offset reference value illustrated in FIG. 16 is applied.

BEST MODE

Hereinafter, an error correction unit for time slice images according to an embodiment of the present invention will be described with reference to the accompanying drawings.

The error correction unit for time slice images according to an embodiment of the present invention is used to be imaged by cameras for capturing time slice images, as illustrated in FIG. 17, thereby providing an offset reference value for correcting errors in time slice images. As illustrated in FIG. 4, the error correction unit includes a stand 110 and 120 and marker members 130.

AS illustrated in FIGS. 4 and 17, the length of the stand 110 and 120 corresponds to the actual height of a subject, such as a human body. That is, the length of the stand 110 and 120 corresponds to the length of a subject, from which time slice images are captured by cameras. The stand 110 and 120 is erected vertically, as illustrated in FIG. 4, to correspond to the length of the subject. The stand 110 and 120 may include a pole 110 having a predetermined length in the vertical direction and a base 120 supporting the lower portion of the pole 110.

For example, as illustrated in FIG. 6, the pole 110 may be comprised of a plurality of bars detachably coupled to each other, thereby defining the length in the vertical direction. Bars among the plurality of bars are detachably coupled to each other via couplers. As illustrated in FIG. 6, the couplers may be comprised of female threads 112 and male threads 111 formed on corresponding ends of the bars, respectively. The couplers detachably couple the plurality of bars to each other by screw connection. Thus, the pole 110 is assembled to define a length corresponding to the height of an actual subject, as required, but may be disassembled for storage or transportation when the pole is not used.

The base 120 may be embodied as a tripod having legs 122 and a top end 121, as illustrated in FIG. 4, such that the pole 110 is vertically coupled to the upper portion thereof. When the base 120 is embodied as a tripod, the legs 122 may have a telescopic structure to vary the vertical position of the pole 110. Due to the telescopic operation thereof, the base 120 may support the lower portion of the pole 110 to erect the pole 110 in a vertical position even on a slope. Alternatively, as illustrated in FIG. 13, the base 120 may be embodied as a plate-shaped member. In this case, the base 120 must be configured such that the area thereof can sufficiently support the pole 110.

As illustrated in FIG. 6, the tripod is detachably fixed to the pole 110, with a thread shaft 121a on an upper portion thereof being screw-connected to a nut hole 110a formed on the lower end of the pole 110.

As illustrated in FIG. 5, the marker members 130 are disposed on the pole 110 to indicate a plurality of reference positions for setting offset reference values, which will be described later. As illustrated in FIG. 5, the marker members 130 are embodied as a plurality of marker members, which are disposed to be spaced apart from each other in the longitudinal direction of the pole 110. The marker members 130 may be embodied as at least one among, for example, a ball, a cylinder, and a cone, as illustrated in FIG. 5, to provide the same shape when imaged from around, as illustrated in FIG. 11. When the marker members 130 are embodied as a ball, a cylinder, or a cone, the marker members 130 are captured as same images, such as circles, rectangles, or triangles, by the cameras surrounding the marker members 130.

The marker members 130 may include, for example, a first marker 130A and a second marker 130b, as illustrated in FIG. 4. The first marker 130A is disposed on a lower portion or a middle portion of the pole 110, as illustrated in the drawing. The second marker 130B is disposed on the pole 110, detached from the first marker 130A, as illustrated in the drawing. Thus, the first maker 130A and the second marker 130B are aligned in a line along the longitudinal direction of the pole 110, as illustrated in FIG. 3.

As illustrated in FIG. 4, the marker members 130 may further include a third marker 130C located between the first marker 130A and the second marker 130B. As illustrated in the drawing, the second marker 130C is equally spaced apart from both the first marker 130A and the second marker 130B, thereby being located in the middle between the first marker 130A and the second marker 130B. Thus, as illustrated in FIG. 14, the third marker 130C is aligned with the first marker 130A and the second marker 130B in a line along the longitudinal direction of the pole 110.

The first to third markers 130A, 130B, and 130C may have different colors due to surface painting or coloring.

Thus, the first to third markers 130A, 130B, and 130C are easily identified due to the different colors.

As illustrated in FIG. 6, each of the marker members 130 has a through-hole 131 extending through opposite portions thereof, allowing the pole 110 to be fitted thereinto or extend therethrough. The diameter of the through-hole 131 may be determined such that the pole 110 is interference-fitted into the through-hole 131. Thus, the marker members 130 may be fixed to the pole 110 by interference fit. When the marker members 130 are moved in the interference-fitted position, the marker members 130 are properly fixed in position.

The marker members 130 may be embodied a ball, a cylinder, or a cone made of foam, having the above-described through-hole 131, to reduce weight and fabrication costs. However, this configuration may be brittle. Thus, as illustrated in FIG. 7, the marker members 130 may be embodied as globes having the through-hole 131. The globe is embodied as, for example, a cover for an electric bulb in the shape of a ball, made of glass, polycarbonate, or plastic. As illustrated in the drawing, the globe extends vertically through the through-hole 131 of the pole 110, and is fixed to a predetermined location of the pole 110 via a fastener, detachably disposed on the pole 110.

The fastener may include, for example, a sleeve 132a and a clamp, as illustrated in FIG. 7. As illustrated in the drawing, the sleeve 132a is fixed to the marker member 130 having the shape of a globe, and the pole 110 is fitted into the hollow portion. As illustrated in the drawing, a flange 132b is provided, allowing one end of the sleeve 132a to be easily attached to the globe. As illustrated in FIG. 8, the flange 132b has a curved surface corresponding to the curved surface of the globe, and is fixed to the globe via fastening bolts 132d.

The clamp couples the sleeve 132b to the pole 110, thereby fixing the sleeve 132a to the pole 110. The clamp may be implemented as, for example, a stop screw 132c, as illustrated in FIG. 7. As illustrated in FIG. 8, the stop screw 132c presses the pole 110 by extending through the sleeve 132a. Thus, the sleeve 132a is fixed to a preset position of the pole 110.

Alternatively, as illustrated in FIG. 9, the clamp may be embodied as a collet CL having a notch N and an incline nut 133 couplable to the collet CL. As illustrated in the drawing, the collet CL is provided on the lower end of the sleeve 132a, since the notch N is formed in the lower end of the sleeve 132a. As illustrated in the drawing, when the incline nut 133 having an inner inclined surface is screw-connected to the collet CL via engagement between threads T1 and T2, the notch N is contracted, thereby reducing the inner diameter of the collet CL in the radial direction of the sleeve 132a. Thus, the inner circumferential surface of the collet CL holds the pole 110, thereby fixing the sleeve 132a to the pole 110. The clamp having this configuration can fix the sleeve 132a to the pole 110 by simply coupling the incline nut 133 to the collet CL, thereby facilitating the fixing of the sleeve 132a to the pole 110.

The marker members 130 embodied as globes, as described above, may be lighted by lighting modules 140, as illustrated in FIG. 10. As illustrated in the drawing, each of the lighting modules 140 may be embodied as, for example, a printed circuit board (PCB) with a light-emitting diode (LED) mounted thereon. The lighting modules 140 are supplied with a driving voltage through electrical lines connected to a power supply P, as illustrated in the drawing. The lighting modules 140 are attached to the inner portions of the marker members 130 to generate light within the marker members 130, as illustrated in the drawing. Since the marker members 130 are irradiated with light from the lighting modules 140, the marker members 130 are easily identifiable from long distances or at night. In particular, when the lighting modules 140 generate a variety of colors of light, the marker members 130 have a variety of colors, thereby being more easily identifiable.

The error correction unit 100 for time slice images according to the embodiment of the present invention, having the above-described configuration, is imaged by a plurality of cameras, as illustrated in FIG. 11, and then respective images, as illustrated in FIG. 12, are provided to terminals (not shown) setting offset reference values. The error correction unit 100 provides reference positions to the terminals via the marker members 130, as illustrated in the enlarged view in FIG. 5, so that the terminals set offset reference values. Thus, as illustrated in the enlarged view, each of the terminals draws imaginary outlines along the contours of the marker members 130, based on the shapes of the marker members 130, and then set centers C of the outlines. In addition, when the marker members 130 are provided as two marker members, the terminal sets a point, located in the middle between the centers C of the marker members 130, as an offset reference value corresponding to the central point of a subject, as illustrated in FIG. 13. Alternatively, when the marker members 130 are provided as three marker members 130 equally distanced from each other, the terminal sets the center C of the middle marker member as an offset reference value corresponding to the central point of a subject, as illustrated in FIG. 14.

Accordingly, since the stand comprised of the pole 110 and the base 120 has a height corresponding to the height of a subject (e.g. a human body) to be actually imaged, as described above, the terminal provides an offset reference value corresponding of the central point of the subject.

As illustrated in FIG. 15, the terminal sets an offset reference value for the correction of inclination based on one of the plurality of marker members 130. Here, as illustrated in the drawing, the terminal sets the offset reference value for the correction of inclination, based on an angle of inclination dA of the other marker member 130 or the pole 110. In addition, as illustrated in FIG. 16, the terminal sets an offset reference value for the correction of a height, based on the distance between the lowermost marker member 130 and the uppermost marker member 130 among the plurality of marker members 130.

Afterwards, the terminal receives images of an actual subject captured by a plurality of cameras, as illustrated in FIG. 17, the received images having configurations, as illustrated in FIG. 18; corrects deviations in the images by comparing deviations in the central points, inclines, and heights of the actually-captured images of the subject, as illustrated in FIGS. 19 to 21; and synthesizes the corrected images, thereby providing time slice images. Since the terminal corrects a variety of deviations of the actually-captured images as described above, the terminal can provide time slice images, in which a variety of errors are correct.

Although the foregoing embodiments have been described for illustrative purposes, the scope of the present invention is not limited thereto since the foregoing embodiments are merely exemplary embodiments of the present invention. The foregoing embodiments may be properly modified (e.g. the structure or configuration may be altered or may be partially omitted or supplemented) within the scope of the same concept as long as the essential features can be satisfied. Some or a majority of the features of the foregoing embodiments may be combined. Since the structures and configurations of respective components included in the embodiments of the present invention can be modified or combined, such modifications and combinations of the structures and the configurations shall be encompassed by the appended Claims of the present invention.

The invention claimed is:

1. An error correction unit for providing offset reference values for error correction of time slice images captured by cameras, the error correction unit comprising:
   a vertically-erected stand, a length of the stand corresponding to a height of a subject, from which time slice images are captured by the cameras; and
   a plurality of marker members disposed on the stand along a longitudinal direction to indicate a plurality of reference positions, based on which the offset reference values are set, the plurality of marker members including:
      a first marker member disposed on a lower portion of the stand;
      a second marker member disposed on a central portion of the stand at a first distance from the first maker member, wherein the second marker member is separated by space from the first marker member so that a portion of the stand is exposed between the first marker member and the second marker member; and
      a third marker member disposed on an upper portion of the stand at a second distance from the second maker member, wherein the third marker member is separated by space from the second marker member so that another portion of the stand is exposed between the second marker member and the third marker member, wherein the first distance between the first and second marker members is equal to the second distance between the second and third marker members,
   wherein a line formed by a central point of the first marker member and a central point of the third marker member in the time slice images captured by the cameras is used to derive an angle of inclination deviation to set an offset reference value for correction of inclination and
   wherein a distance between the central point of the first marker member and the central point of the third marker member in the time slice images captured by the cameras is used to set an offset reference value for correction of height.

2. The error correction unit according to claim 1, wherein each of the marker members comprises at least one among a ball, which is imaged as a circle by the surrounding cameras, a cylinder, which is imaged as a rectangle by the surrounding cameras, and a cone, which is imaged as a triangle by the surrounding cameras.

3. The error correction unit according to claim 1, wherein the stand comprises:
   a pole having a predetermined length in a vertical direction; and
   a base supporting a lower portion of the pole.

4. The error correction unit according to claim 3, wherein the base comprises a tripod, with the pole being vertically coupled to a top portion thereof.

5. The error correction unit according to claim 3, wherein each of the marker members comprises a ball, a cylinder, or a cone having a through-hole, allowing the stand to be fitted thereinto while extending therethrough.

6. The error correction unit according to claim 3, wherein each of the marker members comprises:
   a spherical globe having a through-hole allowing the stand to vertically extend therethrough; and
   a fastener detachably disposed on the stand.

7. The error correction unit according to claim 6, wherein the fastener comprises:
   a sleeve fixed to the globe, allowing the stand to be fitted thereinto; and
   a clamp coupling the sleeve to the stand, such that the sleeve is fixed to the stand.

8. The error correction unit according to claim 7, wherein the clamp comprises a stop bolt pressing the stand by extending through the sleeve.

* * * * *